United States Patent
Magri et al.

(10) Patent No.: US 11,728,898 B2
(45) Date of Patent: Aug. 15, 2023

(54) METHOD AND APPARATUS FOR OPTICAL POWER CONTROL

(71) Applicant: Telefonaktiebolaget LM Ericsson (publ), Stockholm (SE)

(72) Inventors: Roberto Magri, Genoa (IT); Alberto Deho, Genoa (IT); Riccardo Ceccatelli, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/614,802

(22) PCT Filed: May 31, 2019

(86) PCT No.: PCT/EP2019/064228
§ 371 (c)(1),
(2) Date: Nov. 29, 2021

(87) PCT Pub. No.: WO2020/239238
PCT Pub. Date: Dec. 3, 2020

(65) Prior Publication Data
US 2022/0231766 A1 Jul. 21, 2022

(51) Int. Cl.
*H04B 10/564* (2013.01)
*H04B 10/077* (2013.01)
*H04B 10/294* (2013.01)
*H04J 14/02* (2006.01)

(52) U.S. Cl.
CPC ......... *H04B 10/564* (2013.01); *H04B 10/077* (2013.01); *H04B 10/2941* (2013.01); *H04J 14/0221* (2013.01); *H04J 14/0272* (2013.01)

(58) Field of Classification Search
None
See application file for complete search history.

(56) References Cited

U.S. PATENT DOCUMENTS

| | | | | |
|---|---|---|---|---|
| 5,761,234 A | * | 6/1998 | Craig | H01S 5/4031 372/50.1 |
| 6,031,644 A | * | 2/2000 | Utsumi | H04B 10/077 398/95 |
| 6,266,171 B1 | * | 7/2001 | Gehlot | H04B 10/505 398/9 |

(Continued)

FOREIGN PATENT DOCUMENTS

| | | |
|---|---|---|
| CN | 108174313 A | 6/2018 |
| WO | 0108331 A1 | 2/2001 |
| WO | 02095990 A1 | 11/2002 |

OTHER PUBLICATIONS

Author Unknown, "SFF-8472 Rev 11.0", SFF-8472 Specification for Diagnostic Monitoring Interface for Optical Transceivers, Rev 11.0, SFF Committee, Sep. 14, 2020, 1-39.

*Primary Examiner* — Darren E Wolf
(74) *Attorney, Agent, or Firm* — Christopher & Weisberg, P.A.

(57) ABSTRACT

A method of power control of an optical signal transmitted by a first network element. The first network element comprising a laser and a bandpass filter operating on the optical signal produced by said laser, whereas the method comprises receiving (106) information indicative of a power level of the optical signal transmitted by the first network element; and tuning (110) the laser output wavelength in response to said received information.

15 Claims, 8 Drawing Sheets

(56) References Cited

U.S. PATENT DOCUMENTS

| | | | |
|---|---|---|---|
| 7,403,988 B1* | 7/2008 | Blouin | H04L 43/00 370/252 |
| 2002/0048062 A1* | 4/2002 | Sakamoto | H04B 10/2916 398/30 |
| 2002/0101633 A1* | 8/2002 | Onaka | H04J 14/0205 398/59 |
| 2005/0163508 A1* | 7/2005 | Hwang | H04J 14/02 398/71 |
| 2007/0223925 A1* | 9/2007 | Ohtani | H04B 10/572 398/79 |
| 2008/0298807 A1* | 12/2008 | Yang | H04Q 11/0067 398/98 |
| 2008/0304824 A1* | 12/2008 | Barbieri | H04B 10/0793 398/38 |
| 2009/0208211 A1* | 8/2009 | Tamai | H04B 10/272 398/67 |
| 2012/0320783 A1* | 12/2012 | Wu | H04L 25/03343 370/252 |
| 2016/0043799 A1 | 2/2016 | Zheng et al. | |
| 2019/0148904 A1* | 5/2019 | Tanaka | H01S 3/06754 359/341.3 |
| 2020/0382241 A1* | 12/2020 | Liu | H04L 1/0041 |

* cited by examiner

METHOD AND APPARATUS FOR OPTICAL POWER CONTROL

TECHNICAL FIELD

The present invention relates to optical communications networks, in general, and in particular, to control of power of optical signal in Passive Optical Networks.

BACKGROUND

One of the problems in optical networks is the control of the dynamic range of the optical power—it is important that power level of an optical signal transmitted from an optical network element (its transceiver), when received at the other end of the optical fibre connecting the transceiver to a receiver is within a dynamic range of the receiver. Unfortunately, the actual system losses and fibre loss are not known during installation. Furthermore, optical access network systems, also known as Passive Optical Networks (or PONs) should be cheap and should be designed without expensive optical monitoring and control devices. Passive Optical Networks are also used as fronthaul and backhaul networks where the high throughput of these networks is particularly beneficial.

In certain situations, if the optical fibre is short, it is possible that the optical power of the optical signal received by the receiver is too high. In this case decoding data transmitted using the optical signal cannot be decoded and optical attenuators (fixed, manually controlled) need be placed by a field engineer. This is a time-consuming and error-prone operation. The field engineer can put a wrong attenuator or forget to verify power levels, etc. It is also possible that an attenuator installed initially can fix the power issue on the day of installation but may lead to problems during the ageing of the system due to attenuation variations and/or channel upgrades.

In solutions known in the art, power control is performed with one of the following techniques:
  Manual fixed attenuators: this is an unreliable and time-consuming operation as described before.
  Transmitter power control: this is expensive and typically NOT a good solution for low cost transceivers used in fronthaul networks which usually do not have any programmable power control capability. Transceivers used in fronthaul networks typically operate at maximum current or maximum power. They have adjustable power would fall in one of the following two cases:
    Laser control: it requires calibration of the bias current for the desired power levels, which increases manufacturing time and cost.
    Integrated Variable Optical Attenuators (VOA): additional component and cost.
  In-line VOA: this requires adding an in-line active element which is not desirable in access and fronthaul/backhaul networks, and indeed not possible in passive networks (i.e. PON). Furthermore, an in-line VOA has no per-channel capability because they apply the same attenuation to all channels (wavelengths) in the fibre and can reduce the effective exploitable dynamic range of the transceivers (distant transceivers are penalized with respect to nearest ones).
  Levelling subsystems (e.g. Wavelength Switching Systems, WSS): too expensive for the access network.

SUMMARY

The inventors realised that per-channel power control, without introducing new active component, would overcome the shortcomings of the earlier known solutions. This is what the solution described in this document is targeting.

Accordingly, the invention seeks to preferably mitigate, alleviate or eliminate one or more of the disadvantages mentioned above singly or in any combination.

According to a first aspect of the present invention there is provided a method of power control of an optical signal transmitted by a first network element, the first network element comprising a laser and a bandpass filter operating on the optical signal produced by said laser. The method comprises receiving information indicative of a power level of the optical signal transmitted by the first network element and tuning the laser output wavelength in response to said received information.

According to a second aspect of the present invention there is provided a first network element for an optical network. The first network element comprises a laser, a bandpass filter operating on the optical signal produced by said laser, a controller circuitry for controlling operation of the laser and a memory. The memory contains instructions executable by the controller circuitry such that the first network element is operative to receive information indicative of a power level of the optical signal transmitted by the first network element and tune the laser output wavelength in response to said received information.

According to a third aspect of the present invention there is provided a second network element for an optical network. The second network element comprises a receiver for receiving an optical signal from a first network element, a laser for transmitting an optical signal to the first network element, a controller circuitry and a memory. The memory contains instructions executable by the controller circuitry such that the second network element is operative to determine information indicative of a power level of the optical signal received by the receiver and to transmit said determined information to the first network element over an in-band communication channel.

According to a fourth aspect of the present invention there is provided a method for supporting power control of an optical signal transmitted by a first network element. The method is performed at a second network element and comprises receiving an optical signal from a first network element and determining information indicative of a power level of the received optical signal. The method further comprises transmitting said determined information to the first network element over an in-band communication channel.

Further features of the present invention are as claimed in the dependent claims.

The present invention in its various embodiments provides the following advantages:
  No hardware modification is needed to implement the invention even in simple optical network transceivers.
  Improved serviceability—no need for fixed attenuators in the field and no manual configuration.
  No need for Variable Optical Attenuators, neither in-line nor integrated in the transceiver module.
  No need for transmitter power control and in consequence, no calibration costs.
  Per-channel control—channel attenuation can be controlled independently from other channels.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In this document we disclose a method and an apparatus for addressing the problem of adjusting power of optical signals received by an optical receiver of an optical network element. The purpose of this power control is to keep the power levels of the optical signals within dynamic range (operational range) of the optical receiver. The main reason for this power control is avoiding overload at the receiver's photodetector (photodiode). This is in particular applicable to metro passive optical networks as well as to other Passive Optical Networks (xPON) and can be explained with reference to FIG. 5. As mentioned earlier, transmitters used in fronthaul networks (as well as in PON based access networks) typically operate at maximum current or maximum power. This means that the lasers in A1 and B1 transmitters launch their optical signals at approximately the same power levels. The optical fibre connecting the A1 transmitter (Tx) to A2 receiver (Rx) is longer than the optical fibre connecting the B1 transmitter (Tx) to B2 receiver (Rx). Since both lasers launched signals at approximately the same power level, the optical signal loss between A1 transmitter and A2 receiver is high enough to deliver optical signal at a power level with operational range of the photodiode of the A2 receiver. If the optical fibre is too short, it may be that the optical signal loss along the optical path is not enough and the power level of the optical signal reaching the optical receiver is too high (i.e. above the upper limit of the operational range of the receiver). This may be the case for the optical signal transmitted from B1 transmitter to B2 receiver. Such a high optical signal level may cause overload of the photodiode at the B2 receiver, which, in turn, means that the B2 receiver cannot decode information transmitted using the optical signal.

Figure 8:
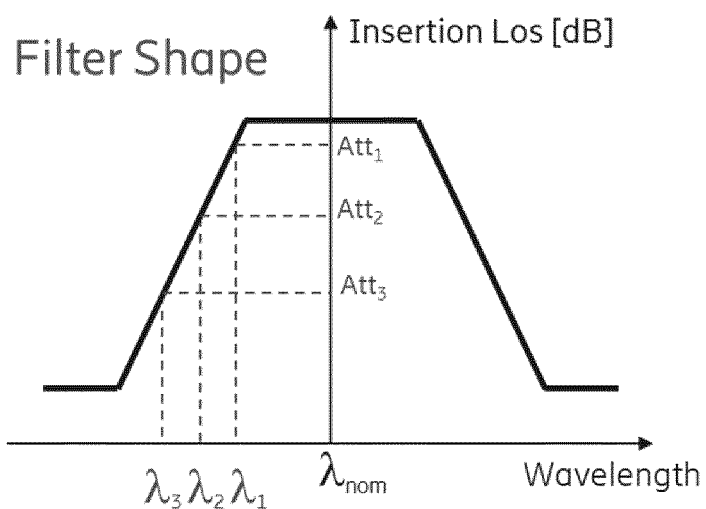
FIG. 8 shows a filter amplitude response chart of a bandpass filter used in embodiments of the present invention.

The solution in embodiments described in this document is based on tuning (adjusting) a laser's traffic wavelength (central wavelength) to a spectral position matching a desired insertion loss of a bandpass filter amplitude response. The bandpass filter operates on the optical signal produced by the laser. In a one embodiment a multiplexer/demultiplexer (Mux/Dmux) may be used as the bandpass filter to achieve a sufficient graded attenuation value. By tuning the wavelength of the optical signal produced by the laser close to the knee of the filter amplitude response it is possible to obtain different levels of attenuation as shown in FIG. 8. In other words, the bandpass filter lets pass a signal at the nominal wavelength ($\lambda_{nom}$) plus some wavelength margin on either side of the nominal wavelength. The further away from $\lambda_{nom}$ the laser is tuned the higher the attenuation of the signal. The inventors realized that because the laser transmits with approximately constant power it should be possible to attenuate the optical signal by tuning the laser away from $\lambda_{nom}$ and reduce the power of the optical signal transmitted by filtering out part of the optical power. The bandpass filter remains unchanged with the same $\lambda_{nom}$ wavelength, but the laser transmits at slightly different wavelength, say $\lambda_1$. This means that in the signal produced by the laser there is less of the $\lambda_{nom}$ (plus the wavelength margin) which is let pass through the bandpass filter and more of the laser's signal is filtered out. In consequence, the power level of the $\lambda_{nom}$ wavelength launched to the optical fibre after passing through the bandpass filter is reduced and can meet the requirements of the operational range of the receiver at the other end of the optical fibre. As shown in FIG. 8 tuning the laser away from $\lambda_{nom}$ to $\lambda_2$ or $\lambda_3$ results in even higher attenuation.

One embodiment of a method of power control of an optical signal will now be described with reference to FIG. 1 and FIG. 3. The optical signal is transmitted, 104, by a first network element, 300, and the first network element, 300, comprises a laser, 302, and a bandpass filter, 306, operating on the optical signal produced by said laser, 302. The method comprises receiving, 106, information indicative of a power level of the optical signal transmitted by the first network element and tuning, 110, the laser output wavelength in response to said received information. By getting the information indicative of a power level of the optical signal the solution is automated by a feedback control loop. Preferably, the feedback (the information indicative of a power level of the optical signal) is indicative of a power level of the optical signal as received by an optical receiver at the other end of the optical fibre 512 (e.g. A2 Rx or B2 Rx in FIG. 5).

Figure 10:
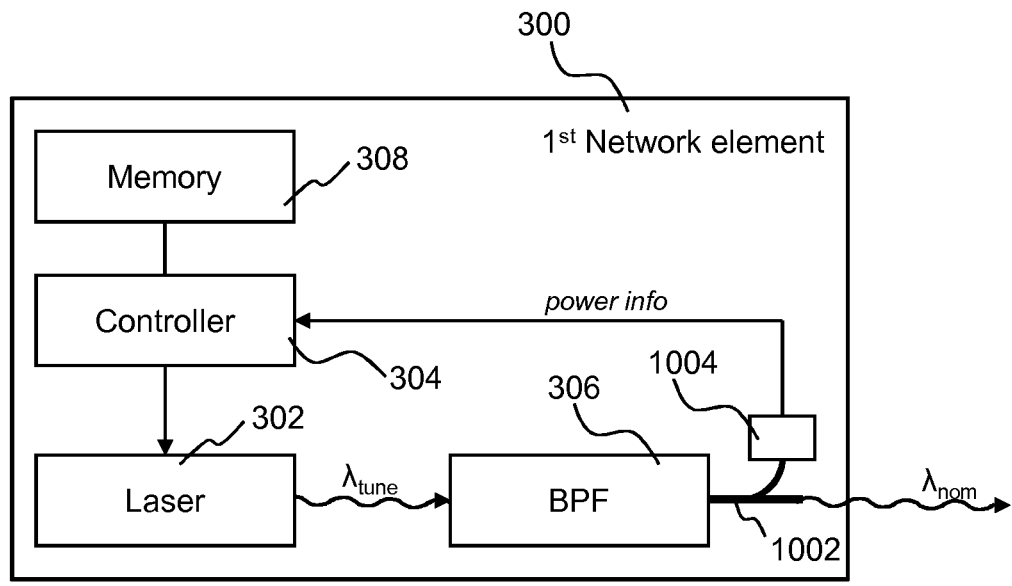
FIG. 10 is a diagram illustrating the first network element for an optical network in another embodiment of the present invention.

In alternative embodiments the feedback may be produced by a photodiode, 1004, at the first network element, 300, which receives a known portion of the optical signal tapped by a power splitter, 1002, at the output. With known length and characteristics of the optical fibre connecting the first network element, 300, and the second network element, 1100, it may be estimated if the power of the optical signal launched to the optical fibre arriving at the far end receiver (of the second network element) will be within its operation range. If the power level is estimated to be above the upper limit of the operational range the laser, 302, is tuned away from the wavelength it is currently producing. An embodiment of a network element operating in this way is illustrated in FIG. 10.

Figure 9:
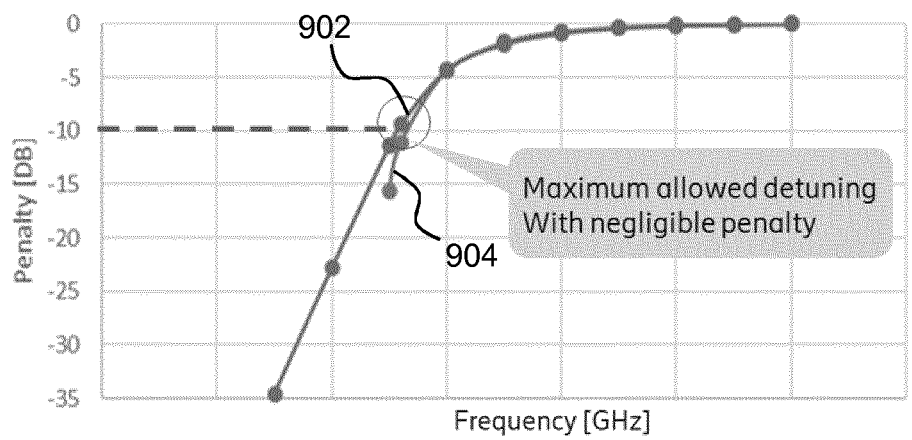
FIG. 9 shows results of simulations of filter insertion loss profile as a function of frequency tuning.

Operating the transmitter of the network element 300 on the filter slope as illustrated in FIG. 8 induces some penalty. To verify the penalty the inventors carried out a numerical simulation of tuning the laser central wavelength at 10 Gbaud/s and at different insertion loss values. The results of the simulations are reported in FIG. 9. The top curve, 902, shows the filter insertion loss profile as a function of the frequency tuning operating point. The bottom curve, 904, represents the actual simulated power penalty (including the insertion loss itself).

The penalty due to eye distortion in an eye diagram is negligible for attenuations up to about 9-10 dB which is a good range for field operation. The distortion occurs when the "eye" is closed so that the receiver cannot distinguish between "1" and "0". When the laser wavelength is tuned at higher insertion loss, the penalty starts increasing due to the higher slope of the filter profile.

In a preferred embodiment, the operation of tuning, 110, comprises adjusting operation of a thermal control block of the laser. In this embodiment, the method is carried out in first network element illustrated in the FIG. 4.

The role of the thermal control block 402 is to keep the laser 302 at an approximately constant temperature to prevent drifting of the laser central wavelength induced by changing temperature of the environment in which the laser operates (e.g. caused by day/night temperature variation or heat produced by the laser itself as well as other modules in the vicinity of the laser).

An important advantage of this embodiment is that it does not require adding an extra component to the first network element. In order to perform the tuning operations, the only requirement on the transceiver is the possibility to act on the laser's thermal control block, 402, and this does not require any hardware change of the transmitter module and has no impact on its cost. In order to tune the wavelength produced by the laser, 302, in accordance with embodiments of the present invention the thermal control block is set by a controller circuitry, 304, to adjust the temperature in which the laser, 302, operates to a different one from the temperature required for producing the current central wavelength.

Please note that when referring to the laser we refer to a central wavelength of the laser and this value may change with the change of the temperature in which the laser operates. When we refer to the bandpass filter, 306, then we refer to the nominal wavelength $\lambda_{nom}$. As mentioned earlier, $\lambda_{nom}$ for the bandpass filter does not change, it is the central wavelength of the laser that is tuned, which results in different portion of the optical signal being filtered out by the fixed bandpass filter, 306.

For example, the laser, 302, may be set to produce an optical signal at central wavelength that is the same as the nominal wavelength of the bandpass filter, 306, i.e. $\lambda_{nom}$. This configuration ensures maximum power of the optical signal being launched to the optical fibre, 512, and if this is required, then the thermal control block, 402, will maintain the laser, 302, at temperature which guarantees production of stable $\lambda_{nom}$. If lower power of the optical signal is needed, then the thermal control block, 402, adjusts the temperature of the laser, 302, and the central wavelength of the laser, 302, is tuned, for example, to $\lambda_1$ as shown in FIG. 8. This results in part of the optical power being filtered out by the bandpass filter, 306, and reduced optical power reaching the receiver of the network element at the far end of the link 512.

In operation, when the network element 300 is switched on the laser's central wavelength may preferably be set by default to $\lambda_{nom}$ of the bandpass filter and the thermal block will keep the temperature of the laser so that the central wavelength is $\lambda_{nom}$. It can be envisaged that in alternative embodiments the default central wavelength of the laser may be offset from the $\lambda_{nom}$ of the bandpass filter. This alternative embodiment with the laser and bandpass filter having their corresponding wavelengths offset has the advantage that by controlling operation of the thermal block it is possible to tune the central wavelength towards $\lambda_{nom}$ of the bandpass filter to increase the power of the transmitted optical signal or to tune the central wavelength further away from $\lambda_{nom}$ of the bandpass filter to reduce the power of the transmitted optical signal.

The typical wavelength thermal coefficient of distributed feedback (DFB) lasers is 0.1 nm/K and only few degrees are enough to span the required tuning range. The thermal control accuracy of the available thermal blocks is already down to a tenth of degree. Therefore, the actual control resolution of transceivers using the method described in this document is enough to provide required accuracy.

For a preferred embodiment with a fully automatic optical signal power control, a closed control loop with a feedback of the status of the optical signal power received at the far end of the optical link is required. This can be ensured by a simple signaling protocol. The advantage of the closed control loop is that it enables compensation for the possible slow drift of the bandpass filter's spectral response with changing environmental temperature.

Figure 5:
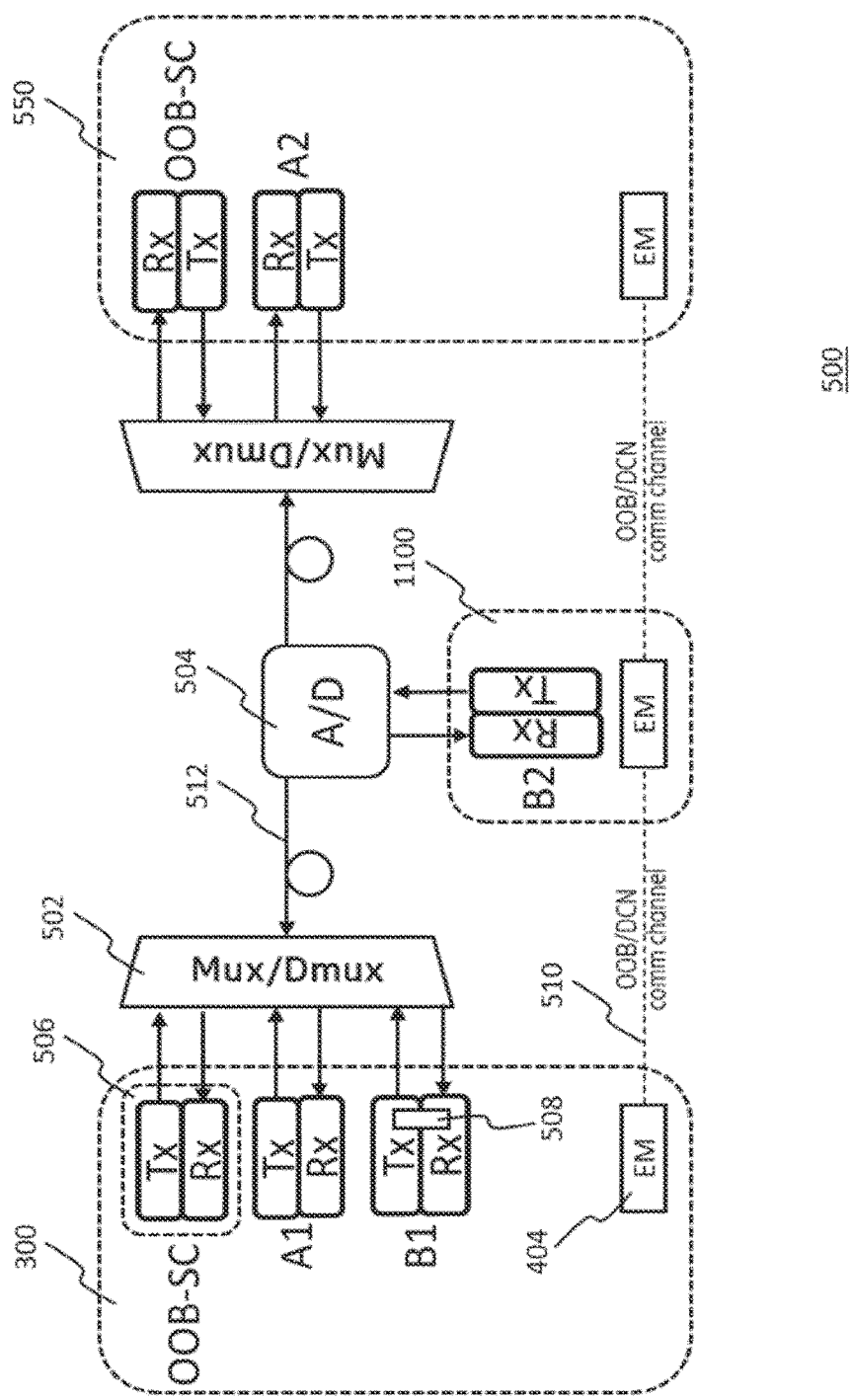
FIG. 5 is a diagram illustrating an optical network comprising network elements according to embodiments of the present invention.

A generic passive optical network, 500, is illustrated in FIG. 5. In this example a first network element, 300, which may also be referred to as a WDM Head-End Equipment (HEE) is optically connected to a second network element, 1100, and a third network element, 550, which may also be referred to as WDM Tail-End Equipment (TEE). Transceiver A1 in the first network element, 300, is connected to transceiver A2 in the third network element, 550, and transceiver B1 in the first network element, 300, is connected to transceiver B2 in the second network element, 1100. The optical network is made up of passive components (Mux/Dmux, 502, and Add/Drop filters, 504). The terms Head-End Equipment (HEE) and Tail-End Equipment (TEE) are mainly used with reference to WDM-PON networks, whereas in TDM based PON networks Optical Line Terminal (OLT) and Optical Network Unit (ONU) are used. ONU is also sometimes referred to as Optical Network Terminal (ONT). OLT corresponds to HEE and ONU corresponds to TEE.

If the optical budget is satisfied, it is anyway possible that some receivers, experiencing a lower insertion loss with compared to others (e.g. Rx in B2 compared to Rx in A2), are or could fall in an overload condition, unless a proper attenuation or power control is added. The overload condition means that the power level of the optical signal received by a photodiode is too high for decoding data encoded in the optical signal.

One aspect of this invention in its various embodiments is how to deliver to the first network element, 300, the information indicative of a power level of the optical signal transmitted by the first network element from the second network element, 1100, at the far end of an optical fibre, 512, connecting these two network elements. This can be achieved by means of an in-band (IB) communication or an out of band (OOB) communication. Out of band communication (Supervisory Channel or a Data Communication Network, DCN) may not be available in all deployments of PON-based networks. This means that in-band communication may be preferred.

Since it is not possible, in general, to ensure availability of an OOB communication channel (e.g. in residential access PON networks), a method to initially set up the optical link (and consequently also an in-band communication channel) could be necessary. Moreover, if the receiving module (photodiode) is in a power overload condition the in-band communication channels that would be available in normal operating conditions (i.e. no overload), e.g., ITU-T G.698.4, R-DDMI (Remote Digital Diagnostic Monitoring Interface), proprietary frame overhead, etc. are not able to guarantee a reliable communication due to the overload. The power overload condition means that the power of the optical signal received by the optical receiver (i.e. photodiode) is above the upper limit of the operational range of the photodiode and this causes inability to decode data carried by the optical signal. Hence, a robust method is required to set the power level of the transmitted wavelength and raise the link.

A preferred embodiment disclosed here is based on low-frequency ON/OFF sequences exchanged between the network elements to set up the optical link. In this embodiment the received information indicative of a power level of the optical signal transmitted by the first network element, 300, is coded using at least one sequence of ON/OFF pulses.

One of the advantages of this embodiment is that even if the power level of the optical signal at the second network element, 1100, were out of the nominal Rx-range (operational range), it should be always possible for any type of receiver to detect at least a low-frequency sequence of ON/OFF pulses.

In one embodiment the procedure may be based on two indications (messages) coded using two different sequences:
PW_IN_RANGE;
PW_OUT_OF_RANGE;
both of which are coded trains of ON/OFF pulses, for example like those depicted in FIG. 7.

Figure 7:
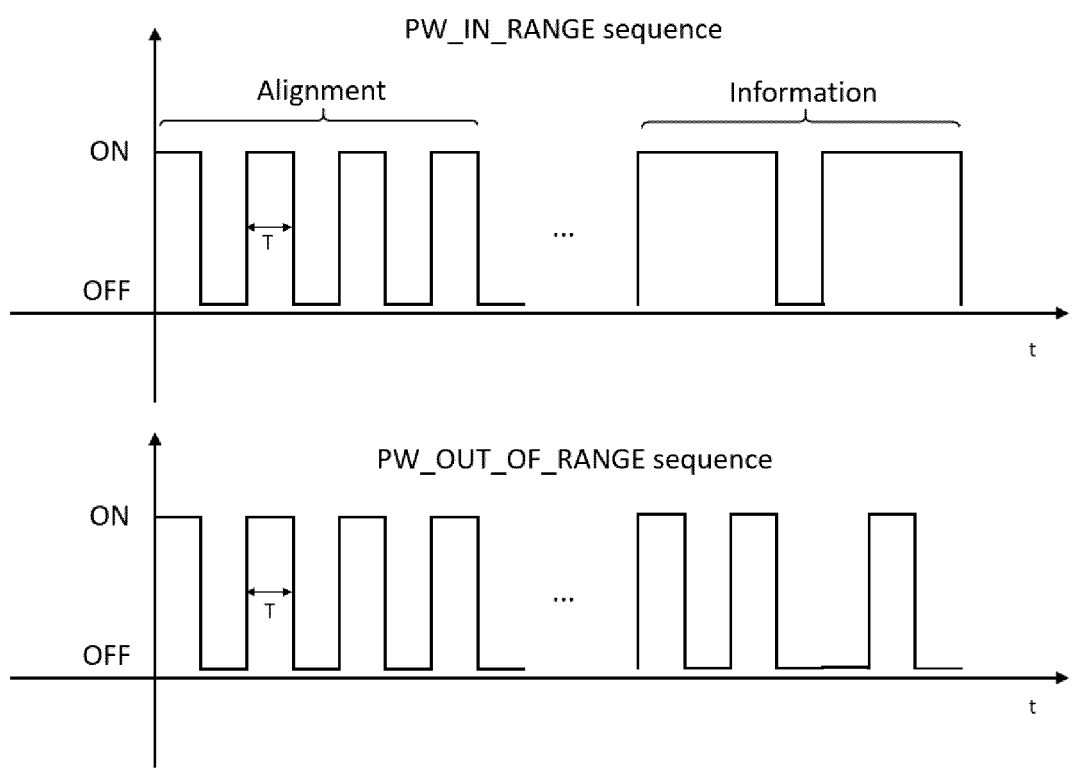
FIG. 7 shows messages indicating power of optical signal coded using a sequence of ON/OFF pulses as used in embodiments of the present invention.

Preferably, one sequence of ON/OFF pulses comprises an alignment part and an information part encoding an indication of a power level of the optical signal. This is also illustrated in FIG. 7.

The alignment part enables the receiver to detect the arrival of the special sequence, whereas the information part encodes one of the two messages: the received power is within the operational range or the received power is out of the operational range. The measurement of the power level of the received optical signal may be performed by the photodetector (photodiode) using the ON/OFF sequence itself on the optical power level of "ON" or on any other "ON" signal. The duration of the pulses ("T" in the picture) is set to ensure detection of the sequence and is implementation specific, i.e. it depends on the photodetector used by the transceiver: it is expected that values of T in the range of 10÷100 ms could be used.

As disclosed in this document a very efficient mechanism for controlling power of the transmitted optical signal can be developed based on these sequences. In a preferred embodiment illustrated in FIG. 2 (with support of FIGS. 4, 5 and 11), once the first network element, 300, is switched on, its laser, 302, is initialized to a default nominal wavelength $\lambda=\lambda_{nom}$, 102, and starts transmitting, 104, an optical signal at said nominal wavelength $\lambda_{nom}$ to its paired receiver at the second network element, 1100. As soon as a the optical signal has been detected by the photodiode, 1102, of the second network element, 1100, illustrated in FIG. 11, the photodiode 1102 and controller 1104 can measure the power level of the received optical signal and then reply with the "PW_IN_RANGE" message if the measured power is in the operational range of the photodiode, 1102, or reply with the "PW_OUT_OF_RANGE" message if the power level of the signal is not in the operational range of the photodiode, 1102.

The first network element, 300, waits for a message from its paired transmitter at the second network element, 1100. If the received message, 106, indicates that the power of the received optical signal is in range, 108—yes, the first network node continues transmission, 104, at the last set wavelength ($\lambda_{nom}$ in this case). If the first network element, 300, receives the "PW_OUT_OF_RANGE" message, 108—no, it tunes, 110, the laser output wavelength to $\lambda=\lambda_{tune}$ and the laser 302 of the first network element transmits at the new wavelength $\lambda_{tune}$, 104. The operations of tuning, 110, transmitting, 104, and receiving, 106, are repeated until a sequence of the ON/OFF pulses corresponding to the "PW_IN_RANGE" message is detected, 108—yes, and in each iteration the previously used wavelength is changed by $\Delta\lambda$.

Preferably, this procedure continues in both directions (i.e. from the first network element, 300, to the second network element, 1100, and in the opposite direction) until the received power at both ends of the optical termination is in range. Once the power level of the received optical signal is within operational range a regular in-band communication channel can be set up.

The optical signal transmitted, 104, by the laser, 302, of the first network element, 300, after initialization, 102, may be interpreted as a request to respond with a message comprising information indicative of the power level of the optical signal transmitted by the first network element, 300. The following messages sent from the second network element, and comprising information indicative of the power level, in a preferred embodiment may be sent periodically. In this way, the first network element, after a series of periodic messages received from the second network element tunes the laser, 302, so that the power level of the optical signal received by the second network element, 1100, is within the operational range of the photodiode 1102.

The above embodiments based on exchanging in-band messages encoded using sequences of ON/OFF pulses allow for coarse power control when neither the out-of-band communication channel nor the regular in-band communication channel are available. In a most basic embodiment this will be enough, the power level of the received optical signal will be brought inside the operational range of the receiver (photodiode, 1102) of the second network element, 1100, and then the regular in-band communication channel will be established.

Figure 6:
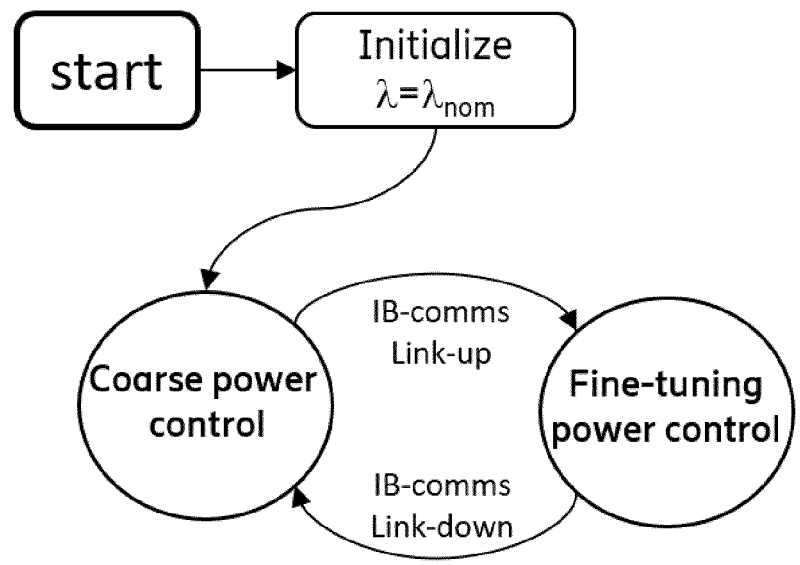
FIG. 6 shows transitions between course and fine-tuning power control in embodiments of the present invention.

In an alternative embodiment, after the coarse power control is completed and the regular in-band communication channel is in operation the method may continue with fine-tuning of the power level of the transmitted optical signal. The transitions between course and fine-tuning power control are illustrated in FIG. 6.

Preferably, at further link down conditions (after link-up) of the in-band (IB) communication channel, this low-level procedure (coarse power control) may be repeated to bring the power of the transmitted signal to its required operational level and in effect to set up the link again. This is illustrated in FIG. 6 where, in case of a system supported only by an IB communication channel, a handover between a fine-tuning power control, based on a more accurate messaging exchange between the first and second network elements, and a coarse power control, based on simple ON/OFF sequences like those described in FIG. 7, is shown.

In one embodiment the fine-tuning power control may be implemented using an out of band (OOB) communication channel. The OOB communication channel may be, for example, a Supervisory Channel (SC), 506, or a Data Communication Network (DCN), 404. Preferably, the OOB communication channel is delivered over a physical medium separate from the physical medium used for delivering the data channel. This may be a different wavelength generated and received by a dedicated transceiver, 506, shown in FIG. 5 as OOB Supervisory Channel connecting the first network element, 300, to the third network element, 550. In an alternative embodiment the OOB channel may be delivered over a link, 510, separate from the optical fibre, 512, for delivering DCN communication to element management (EM) interface, 404, as shown for network elements 300 and 1100. In these cases, the OOB communication channel is working regardless of the optical power settings of the transceiver for the data channel (e.g. A1, B1, A2, B2 in FIG. 5) and therefore a fine-tuning power control loop can be exploited using received power information measured by the transceivers. Particularly, the following information indicative of a power level of the optical signal transmitted by a network element may be exchanged between network elements:

"Rx power".
"Rx Power High".
"Rx Power Low".

The above messages are already defined and available in the SFP (small form-factor pluggable) standard DDMI table (SFF-8472 Specification for Diagnostic Monitoring Interface for Optical Transceivers, Rev 11.0).

In a preferred embodiment the above messages containing information indicative of a power level of the optical signal transmitted by the first network element are communicated periodically or, in an alternative embodiment, in response to a request from the transmitting network element on the other end of the optical fibre link. Once received the information is used locally to control the transmitter power via tuning of the laser output wavelength in response to said received information.

In embodiments of the method the coarse power control solves the problem of receiver overload when OOB communication is not available. The coarse power control is carried out using in-band communication. The fine-tuning power control may use OOB or IB communication channel. The OOB embodiments have already been described. For fine-tuning power control using IB communication one can use, for example THMC (tail-to-head message channel) related to the G.metro (defined in ITU-T G.698 standard series) or for GPON deployments the OMCI (ONU Management and Control Interface, defined in ITU-T G.988 ver. 11/17) may be used. In both these examples reserved fields in THMC or OMCI messages may be used to deliver the Rx_power, Rx_Power_High and Rx_Power_Low messages. Of course, other in-band protocols capable of delivering information indicative of a power level of the optical signal can be easily envisaged.

To illustrate an embodiment of the method of power control of an optical signal transmitted by a first network element, let's use the example of the link from B1 to B2 in FIG. 5. When the procedure starts, the B1 laser is initially set at a wavelength equal to the nominal wavelength of the bandpass filter, 306, (i.e. $\lambda=\lambda_{nom}$), 102, and after the B1 started transmitting at the set wavelength $\lambda$, the power control mechanism waits for a response, 106, from the second network element, 1100. If the received information from the second network element, 1100, shows that the power of the optical signal transmitted by the transmitter at B1 is within the normal range (Rx_power_low<Rx_power<Rx_power_high), 108—yes, then the wavelength can be maintained at $\lambda=\lambda_{nom}$ and the procedure can be repeated periodically. The control doesn't need to be fast since power or temperature variations are slow (e.g. once every 30 secs to ensure a continuous monitoring of the optical link).

If, however, the received information indicative of a power level of the optical signal transmitted by the transmitter in B1 indicates that the power level of said optical signal at the receiver in B2 is out of range, 108—no, then it is necessary to tune the wavelength to operate in a different point of the filter curve: $\lambda_{tune}=\lambda+\Delta\lambda$ and then setting $\lambda=\lambda_{tune}$, 110. This reduces the power level of the optical signal launched into the optical fibre by the transmitter in B1. The laser in B1 transmits at slightly different wavelength, the power level of the optical signal at the B2 receiver drops and in the next pass of the method the information indicative of a power level is received again, 106, and if in range, 108—yes, the transmitter in B1 continues transmission at the previously set $\lambda_{tune}$ wavelength. It may be that more than one pass of the method needs to be performed before the optical power level of the signal at the receiver in B2 is within the operational range.

If the method doesn't find a proper operating wavelength of the laser in the B1's transmitter (the whole range has been swept without finding a wavelength value that would bring the optical signal power lever at the receiver within its operational range), 204—no and the procedure is aborted. This means that we are below the sensitivity level (and the link is not feasible) or that the optical fibre link connecting the transmitter to the receiver is too short and only with additional components (attenuators) discussed in the background section is possible to make the optical link working properly. The sensitivity level is a value specific for each type of photodetector and defined at a fixed bit error rate. Below the sensitivity level the number of errors in recovering the signal increases so that the receiver practically fails to read the signal.

In a preferred embodiment the wavelength tuning range limit is reached when the corresponding attenuation is equal or greater than 10 dB, where the attenuation at a specific $\lambda_{tune}$ wavelength can be calculated as follows:

$$\text{Attenuation}=(Rx\_\text{power at }\lambda_{nom})-(Rx\_\text{power at }\lambda_{tune}),$$

The threshold value of 10 dB has been selected to maintain acceptable the introduced penalty as discussed earlier and illustrated in FIG. 9, but in alternative embodiments different thresholds may be used.

Figure 1:
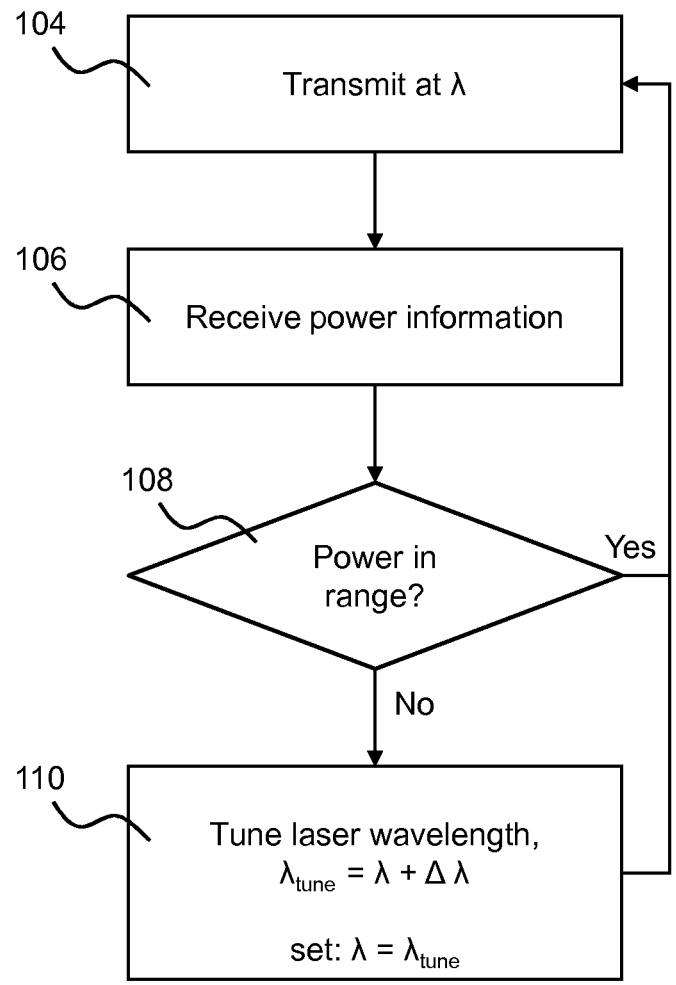
FIG. 1 is a flowchart illustrating a method of power control of an optical signal in one embodiment of the present invention.
Figure 2:
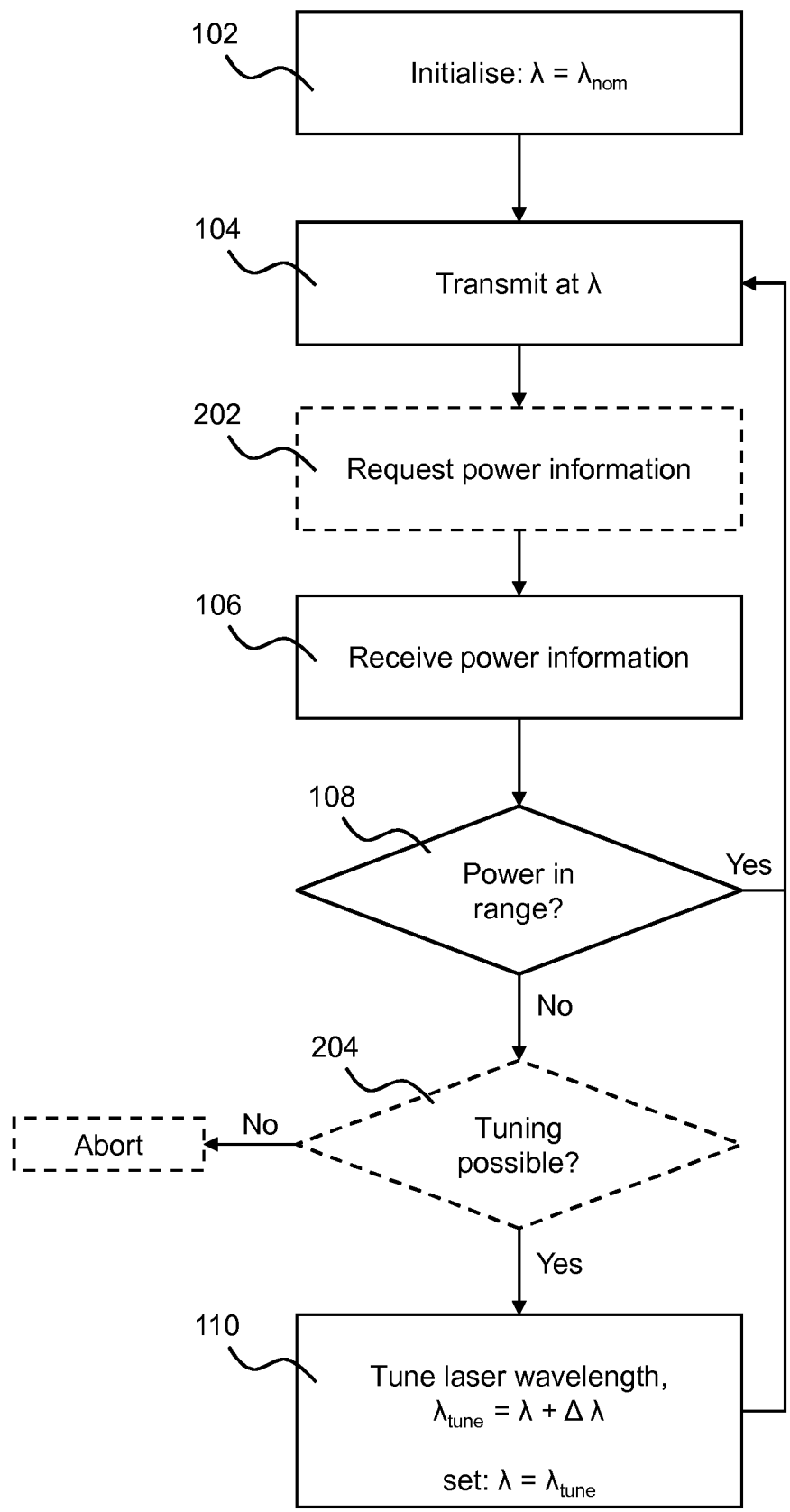
FIG. 2 is a flowchart illustrating the method of power control of an optical signal in another embodiment of the present invention.

In a preferred embodiment the automatic power adjustment method illustrated in FIGS. 1 and 2 may operate continually with periodic reception of information indicative of the power level of the optical signal transmitted by the first network element and adjusting the power level if necessary. In an alternative embodiment, illustrated in FIG. 2, the information indicative of the power level of the optical signal may be received, 106, in response to a request, 202.

Alternatively, the invention may also be described as a method of adjusting attenuation of an optical path which is performed by a first network element. As in the previously described embodiments the first network element may comprise a laser and a bandpass filter operating on the optical signal produced by said laser. The method comprises receiving information indicative of a power level of the optical signal transmitted by the first network element over said optical path and then tuning the laser output wavelength in response to said received information. Details of embodiments of the invention are already described earlier and they are equally applicable here.

Figure 12:
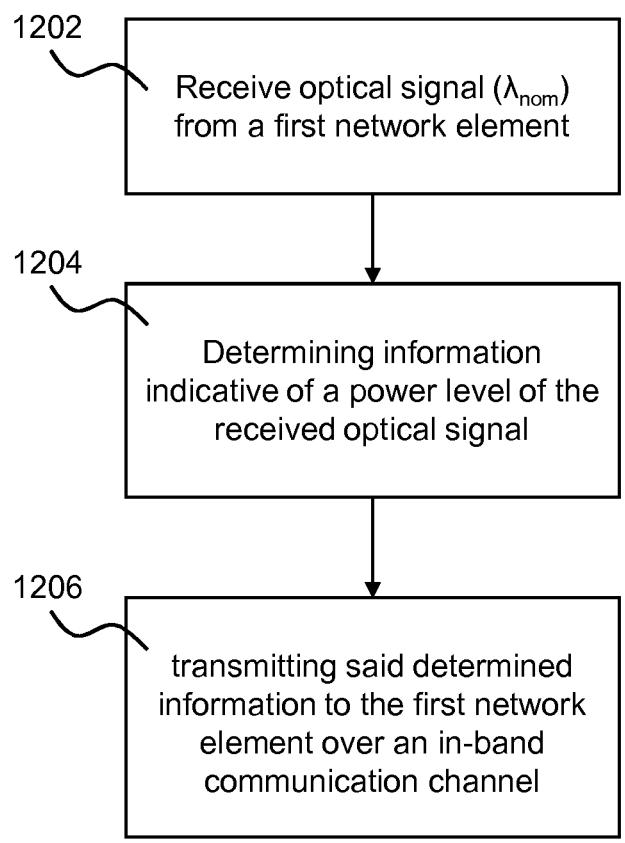
FIG. 12 is a flowchart illustrating a method for supporting power control of an optical signal in one embodiment of the present invention.

With reference to FIG. 12 one embodiment of a method for supporting power control of an optical signal transmitted by a first network element is now to be described. In this embodiment the method is performed at a second network element, 1100, and comprises receiving, 1202, an optical signal from a first network element, 300. As explained earlier, the first network element transmits optical signal generated by the laser, 302, and the filtered by the bandpass filter, 306. For a bandpass filter with nominal wavelength of $\lambda_{nom}$ the second network element, 1100, receives optical signal of $\lambda_{nom}$ wavelength. The method further comprises determining, 1204, information indicative of a power level of the received optical signal and transmitting, 1206, said determined information to the first network element, 300, over an in-band communication channel. In one embodiment the information may include one of two indications (messages):

PW_IN_RANGE;
PW_OUT_OF_RANGE;

In a preferred embodiment these indications (messages) are coded using a sequence of ON/OFF pulses, for example like those shown in FIG. 7.

More details about embodiments of the method for supporting power control of an optical signal will be disclosed in description of the second network element, 1100.

Figure 3:
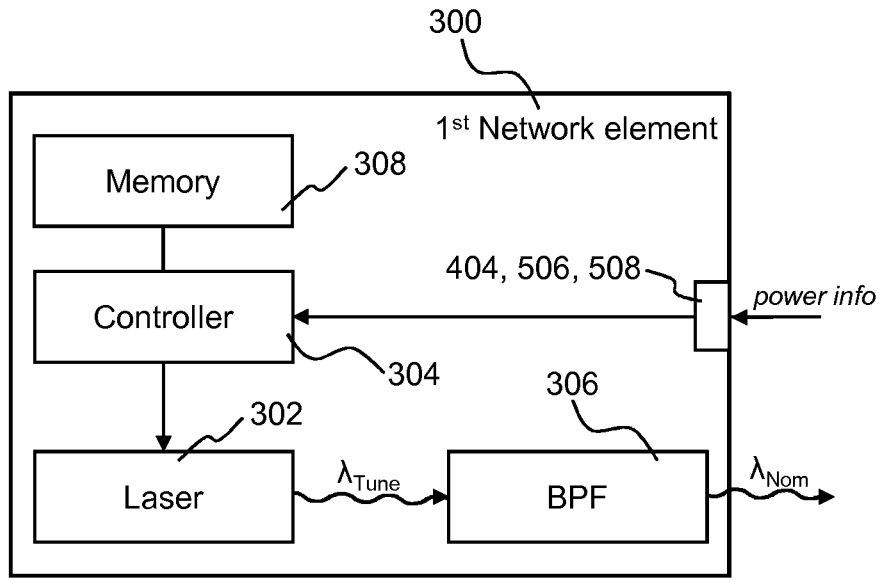
FIG. 3 is a diagram illustrating a first network element for an optical network in one embodiment of the present invention.

With reference to FIG. 3 one embodiment of a first network element, 300, will now be described. The first network element, 300, is for use in an optical network and is operative to perform embodiments of the method described earlier. The first network element, 300, comprises a laser, 302, and a bandpass filter, 306, operating on the optical signal produced by said laser, 302. The first network element, 300, further comprises a controller circuitry, 304, for controlling operation of the laser, 302, and a memory, 308.

In one embodiment the controller circuitry, 304, may comprise one or a combination of more devices like a microprocessor, controller, microcontroller, central processing unit, digital signal processor (DSP), application-specific integrated circuit (ASIC), field programmable gate array (FPGA), or any other suitable computing device, resource, or a combination of hardware, software and/or encoded logic operable to provide, either alone or in cooperation with other components of the network element, 300, for example the memory, 308, and the laser, 302, the functionality described in embodiments of the method. For example, the controller circuitry, 304, may execute instructions stored in the memory, 308. In some embodiments, controller circuitry, 304, may include a system on a chip (SOC).

The memory, 308, may include a Read-Only Memory (ROM), e.g., a flash ROM, a Random-Access Memory (RAM), e.g., a Dynamic RAM (DRAM) or Static RAM (SRAM), a mass storage, e.g., a hard disk or solid-state disk, or the like. The memory, 308, may include software, 408, and/or control parameters, 406 which provide instructions for the controller circuitry. In other words, the software, 408, and/or control parameters, 406, in the memory, 308, may provide a suitably configured program code to be executed by the controller circuitry, 304, so as to implement the above-described method as explained in connection with FIGS. 1 and 2.

The memory, 308, contains instructions executable by the controller circuitry, 304, such that the first network element, 300, is operative to receive information indicative of a power level of the optical signal transmitted by the first network element and tune the laser output wavelength in response to said received information.

As explained in the description of the embodiments of the method by tuning the laser the amount of optical power generated within the pass-band of the bandpass filter, 306, changes and in effect in response to the tuning of the laser output wavelength the power level of the optical signal passing through the bandpass filter, 306, changes too.

Figure 4:
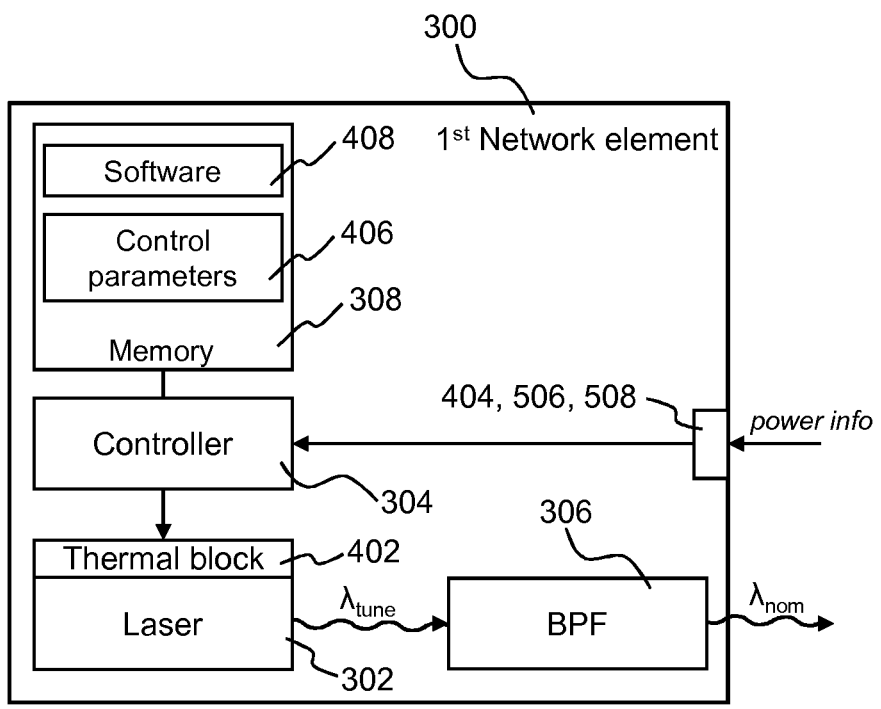
FIG. 4 is a diagram illustrating the first network element for an optical network in another embodiment of the present invention.

In a preferred embodiment, the first network element, 300, as illustrated in FIG. 4, comprises a thermal control block, 402, for controlling temperature of operation of the laser, 302, and the first network element, 300, is operative to tune the laser output wavelength by adjusting operation of said thermal control block, 402.

While in the embodiment illustrated in FIG. 3 the controller circuitry, 304, controls operations of driving a tunable laser in order to tune the produced wavelength, in the embodiment illustrated in FIG. 4 the controller circuitry, 304, interacts with the thermal control block, 402, of the laser, 302. Interacting with the thermal control block does not exclude issuing control commands to the laser, 302, in the embodiment illustrated in FIG. 4. The advantage of the embodiment in which the wavelength tuning is implemented by controlling the operation of the laser's thermal control block is that it allows using cheaper, fixed wavelength lasers instead of more expensive tunable lasers. Additionally, driving tunable lasers also requires more complex control components which further increase overall cost of network elements. This is especially important if one considers the fact that the main field of application of this solution are passive optical networks, in which connected terminal operates on a fixed wavelength.

In a preferred embodiment the received information is indicative of a power level of the optical signal as received at a second network element at the other end of an optical fibre link connecting the first network element, 300, and the second network element, 1100. Also, preferably, the first network element, 300, is operative to periodically receive the information indicative of the power level of the optical signal transmitted by the first network element whereas in alternative embodiments the first network element, 300, is operative to request from the second network element the information indicative of the power level of the optical signal transmitted by the first network element.

As discussed in the description of embodiments of the method, delivering to the first network element the information indicative of a power level of the optical signal can be achieved by means of an in-band (IB) communication or an out of band (OOB) communication and because out of band communication (Supervisory Channel or a Data Communication Network, DCN) may not be available in all deployments of PON-based networks the in-band communication may be preferred. Therefore, the first network element, 300, preferably comprises a second interface, 508, operative to receive the information indicative of a power level of the optical signal over an in-band communication channel. In a preferred embodiment the received information is coded using at least one sequence of ON/OFF pulses. This allows for using the photodiode of the receiver of the first network element, as illustrated in transceiver B1 in FIG. 5.

As discussed in the description of the embodiments of the method, the in-band communication using the ON/OFF pulses is particularly useful in the case of overload condition at the receiver (i.e. when the power level of the optical signal as received at the second network element is above the upper limit of an operational range of said second network element). This means that in order to ensure at least basic communication between the first, 300, and second, 1100, network elements the ON/OFF pulses are preferably exchanged in both directions. Therefore, the interface, 508, is schematically illustrated as spanning over both Rx and Tx parts of the transceiver B1 in FIG. 5.

Preferably, the at least one sequence of ON/OFF pulses comprises an alignment part and an information part as illustrated in FIG. 7.

In an alternative embodiment the first network element, 300, may comprise a first interface, 404, 506, operative to receive the information indicative of a power level of the optical signal over an out-of-band (OOB) communication channel. In one embodiment the OOB communication channel may be, for example, a Supervisory Channel (SC), 506, or a Data Communication Network (DCN), 404. Preferably, the OOB communication channel is delivered over a physical medium separate from the physical medium used for delivering the data channel. This may be a different wavelength generated and received by a dedicated transceiver, 506, shown in FIG. 5 as OOB Supervisory Channel connecting the first network element, 300, to the third network element, 550. In an alternative embodiment the OOB channel may be delivered over a link, 510, separate from the optical fibre, 512, for delivering DCN communication to element management (EM) interface, 404, as shown for network elements 300 and 1100.

In a preferred embodiment the received information indicative of a power level of the optical signal is compliant with Digital Diagnostic Monitoring Interface.

The messages delivering the information indicative of a power level of the optical signal are preferably simple indications of whether the power level of the signal received by the second network element is within or above the operational range of the photodiode of the receiver of the second network element. Details for example messages that may be used were discussed earlier in this document.

Description of embodiments showing the coarse power control using the in-band communication and fine-tuning power control was provided earlier in this document and the transitions between course and fine-tuning power control are illustrated in FIG. 6. The first network element, 300, is therefore operative to use an out-of-band communication channel to receive the information indicative of a power level of the optical signal after the power level of the optical signal as received at the second network element is brought inside the operational range of said second network element.

Thus, the in-band based coarse power control allows for bringing the power down to a level that the second network element, 1100, can establish communication channel with the first network element, 300, and decode data transmitted using the received optical signal. Once the power level is within the operational range and communication is established also the OOB communication channel may be established (if it wasn't available) and used for fine-tuning power control as described earlier.

As illustrated in FIG. 5 a network element, for example a first network element 300, may comprise a plurality of optical transceivers. In these embodiments the bandpass filter, 306, may comprises a multiplexer, 502. A multiplexer, in addition to the function of producing at its output a multiplex of a plurality of signals (wavelengths) received at its input comprises bandpass filters for the signals to be multiplexed in order to reduce channel crosstalk. Therefore, as mentioned earlier, the present invention as described in its embodiments does not require additional components to be added to the network element.

Figure 11:
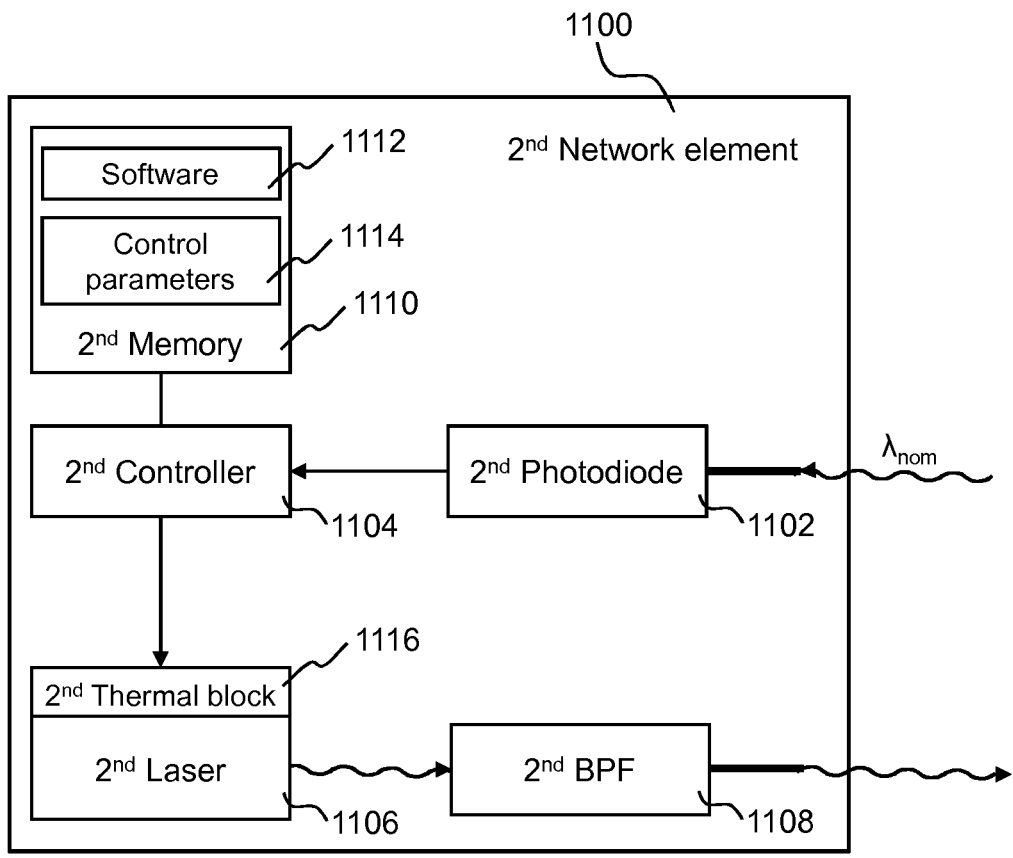
FIG. 11 is a diagram illustrating the second network element for an optical network in another embodiment of the present invention.

With reference to FIG. 11 one embodiment of a second network element, 1100, will now be described. The second network element, 1100, is for use in an optical network and comprises a receiver, 1102, for receiving an optical signal, $\lambda_{nom}$, over an optical fibre from the first network element, 300. It also comprises a laser, 1106, for transmitting optical signals to the first network element, 300, a controller circuitry, 1104, and a memory, 1110. The memory, 1110, contains instructions executable by the controller circuitry, 1104, such that the second network element, 1100, is operative to determine information indicative of a power level of the optical signal, $\lambda_{nom}$, received by the receiver, 1102, and to transmit said determined information to the first network element, 300, over an in-band communication channel.

In the embodiments of the second network element, 1100, the controller circuitry, 1104, and the memory, 1110, may be one of the types discussed earlier with relation to the first network element. Similarly, the description of software, instructions and control parameters provided in description of embodiments of the first network element, 300, are equally applicable to corresponding components, 1112 and 1114, of the second network element, 1100.

In a preferred embodiment the second network element, 1100, is operative to transmit the information indicative of the power level of the optical signal, $\lambda_{nom}$, coded using at least one sequence of ON/OFF pulses. Preferably, the at least one sequence of ON/OFF pulses comprises an alignment part and an information part as illustrated in FIG. 7.

In a preferred embodiment the second network element, 1100, is operative to transmit the information indicative of the power level of the optical signal coded using the at least one sequence of ON/OFF pulses when the power level of the received optical signal, $\lambda_{nom}$, is outside an operational range of said second network element.

In another preferred embodiment the second network element, 1100, is further operative to use an out-of-band communication channel to transmit the information indicative of a power level of the received optical signal, $\lambda_{nom}$, after the power level of the received optical signal, $\lambda_{nom}$, is brought inside the operational range of said second network element.

The second network element, 1100, may transmit the information indicative of the power level of the received optical signal periodically or in response to a request from the first network element, 300.

Further, it is important to understand that the operations of controlling power level of optical signals in embodiments of this invention may preferably be implemented in both directions. The first network element, 300, transmits optical signal to the second network element, 1100, and needs to control the power level of the optical signal it sends, but at the same time the first network element, 300, receives optical signal from the second network element, 1100. Therefore, the same control of power level of the optical signal transmitted is preferably implemented in the second network element, 1100.

The network elements illustrated in the drawings are presented in simplified forms with elements not necessary for explaining particular embodiments omitted. For example, the network element, 300, illustrated in FIG. 4 has elements the necessary for explaining control of the power level of the optical signal transmitted from the network element 300. This means that only the transmitter portion is illustrated with the receiver portion not shown. On the other hand, the second network element, 1100, illustrated in FIG. 11 shows in great simplification both transmitter and receiver sections. As discussed earlier, because the method in its preferred embodiments may be implemented for controlling of power level of optical signals in both directions of an optical link, the laser, 1106, bandpass filter, 1108, photodiode, 1102, controller, 1104, memory, 1110, software, 1112, control parameters, 1114, and the thermal block, 1116 shown as part of the second network element correspond to similar elements in the first network element, 300.

It would be envisaged by a person skilled in the art that an actual implementation of the invention as defined in the claims and described in the embodiments may include transmitter and receiver sections in a single network element or even several transmitter and receiver sections in a single network element as illustrated in FIG. 5.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Further Embodiments

A1. A second network element for an optical network, comprising a receiver for receiving an optical signal from a first network element, a laser for transmitting an optical signal to the first network element, a controller circuitry and a memory, the memory containing instructions executable by the controller circuitry such that the second network element is operative to determine information indicative of a power level of the optical signal received by the receiver and to transmit said determined information to the first network element over an in-band communication channel.

A2. The second network element according to claim A1, wherein the second network element is operative to transmit the information indicative of the power level of the received optical signal coded using at least one sequence of ON/OFF pulses.

A3. The second network element according to claim A2, wherein the at least one sequence of ON/OFF pulses comprises an alignment part and an information part.

A4. The second network element according to claim A2 or A3 operative to transmit the information coded using the at least one sequence of ON/OFF pulses when the power level of the received optical signal is outside an operational range of said second network element.

A5. The second network element according to claim A4 further operative to use an out-of-band communication channel to transmit the information indicative of a power level of the received optical signal after the power level of the received optical signal is brought inside the operational range of said second network element.

A6. The second network element according to any one of claims A1-A5 operative to transmit periodically the information indicative of the power level of the received optical signal.

A7. The second network element according to any one of claims A1-A6 operative to transmit the information indicative of the power level of the received optical signal in response to a request from the first network element.

A8. A method for supporting power control of an optical signal transmitted by a first network element, the method performed at a second network element and comprising:
  receiving an optical signal from a first network element,
    determining information indicative of a power level of the received optical signal, and
  transmitting said determined information to the first network element over an in-band communication channel.

The invention claimed is:

1. A method of power control of an optical signal transmitted by a first network element at a nominal wavelength, $\lambda_{nom}$, the first network element comprising a laser and a bandpass filter operating on the optical signal produced by said laser by letting pass an optical signal at the nominal wavelength, $\lambda_{nom}$, the method comprising:
  receiving information indicative of a power level of the optical signal transmitted by the first network element, the received information received by the first network element over an in-band communication channel; and
  attenuating the optical signal transmitted by the first network element by tuning the laser output wavelength away from the nominal wavelength, $\lambda_{nom}$, the attenuating performed in response to the power level of the optical signal received at the second network element being outside an operational range of the second network element.

2. The method of claim 1, wherein the operation of tuning comprises adjusting operation of a thermal control block of the laser.

3. The method of claim 1, wherein the received information is received by the first network element over an out-of-band communication channel.

4. The method of claim 1, wherein the received information is compliant with Digital Diagnostic Monitoring Interface.

5. The method of claim 1, wherein the information indicative of the power level of the optical signal transmitted by the first network element is received periodically.

6. The method of claim 1, wherein the information indicative of the power level of the optical signal transmitted by the first network element is received in response to a request from the first network element.

7. The method of claim 1, wherein the received information is coded using at least one sequence of ON/OFF pulses.

8. The method of claim 7, wherein the at least one sequence of ON/OFF pulses comprises an alignment part and an information part.

9. A first network element for transmitting an optical signal at a nominal wavelength, $\lambda_{nom}$, in an optical network, the first network element comprising a laser, a bandpass filter operating on the optical signal produced by said laser by letting pass an optical signal at the nominal wavelength, $\lambda_{nom}$, a controller circuitry for controlling operation of the laser, an interface configured to receive information indicative of a power level of the optical signal over an in-band communication channel and a memory, the memory containing instructions executable by the controller circuitry such that the first network element is configured to:
  receive information indicative of a power level of the optical signal transmitted by the first network element, the received information coded using at least one sequence of ON/OFF and the first network element configured to receive the information coded using the at least one sequence of ON/OFF pulses when the power level of the optical signal received at the second network element is outside an operational range of the second network element; and
  attenuate the optical signal transmitted by the first network element by tuning the laser output wavelength away from the nominal wavelength, $\lambda_{nom}$, in response to said received information.

10. The first network element of claim 9 comprising a thermal control block for controlling temperature of operation of the laser wherein the first network element is operative to tune the laser output wavelength by adjusting operation of said thermal control block.

11. The first network element of claim 9, wherein the received information is indicative of a power level of the optical signal as received at a second network element at the other end of an optical fibre link connecting said first network element and said second network element.

12. The first network element of claim 9, comprising a second interface configured to receive the information indicative of a power level of the optical signal over an out-of-band communication channel.

13. The first network element of claim 9, wherein the received information is compliant with Digital Diagnostic Monitoring Interface.

14. The first network element of claim 9, wherein the at least one sequence of ON/OFF pulses comprises an alignment part and an information part.

15. The first network element of claim 9, wherein the bandpass filter comprises a multiplexer.

* * * * *